(12) United States Patent
Hollenkamp

(10) Patent No.: US 10,077,419 B2
(45) Date of Patent: Sep. 18, 2018

(54) METHOD FOR MASS PRODUCING ALCOHOL-CONTAINING SPHERICAL BEADS

(71) Applicant: Steven J. Hollenkamp, Brooklyn, NY (US)

(72) Inventor: Steven J. Hollenkamp, Brooklyn, NY (US)

( * ) Notice: Subject to any disclaimer, the term of this patent is extended or adjusted under 35 U.S.C. 154(b) by 204 days.

(21) Appl. No.: 15/052,406

(22) Filed: Feb. 24, 2016

(65) Prior Publication Data

US 2016/0257916 A1    Sep. 8, 2016

Related U.S. Application Data

(63) Continuation-in-part of application No. 14/069,330, filed on Oct. 31, 2013.

(51) Int. Cl.

| | |
|---|---|
| C12G 3/06 | (2006.01) |
| A23L 1/00 | (2006.01) |
| A23L 1/0522 | (2006.01) |
| A23L 1/054 | (2006.01) |
| C12G 3/04 | (2006.01) |
| A23P 10/30 | (2016.01) |
| A23L 27/00 | (2016.01) |

(52) U.S. Cl.
CPC .............. *C12G 3/06* (2013.01); *A23L 1/0052* (2013.01); *A23L 1/0076* (2013.01); *A23L 1/0522* (2013.01); *A23L 1/0541* (2013.01); *A23L 27/72* (2016.08); *A23P 10/30* (2016.08); *C12G 3/04* (2013.01)

(58) Field of Classification Search
CPC ................ C12G 3/00; C12G 1/00; A23L 2/56

USPC ..... 426/11, 89, 98, 103, 592, 282, 138, 277, 426/516, 519, 576
See application file for complete search history.

(56) References Cited

U.S. PATENT DOCUMENTS

| | | | |
|---|---|---|---|
| 2003/0124225 A1* | 7/2003 | West ................... | A23G 3/36 426/89 |
| 2004/0159241 A1* | 8/2004 | Bailey ................. | B65D 65/46 99/275 |
| 2008/0057110 A1* | 3/2008 | Skirpa ................. | C12C 5/023 424/439 |
| 2009/0155427 A1* | 6/2009 | Jobe .................... | A21D 2/14 426/96 |
| 2010/0221381 A1* | 9/2010 | Jobe .................... | A21D 2/14 426/11 |
| 2012/0196007 A1* | 8/2012 | Meyer ................. | A23L 2/39 426/96 |
| 2013/0045319 A1* | 2/2013 | Castro Forns ....... | A23L 2/54 426/592 |
| 2015/0342226 A1* | 12/2015 | Fountain .............. | C12G 3/00 424/439 |

* cited by examiner

*Primary Examiner* — Nina Bhat
(74) *Attorney, Agent, or Firm* — Gary P. Topolosky

(57) ABSTRACT

A method for making an alcohol-containing food product comprises combining: (a) a first aqueous solution that includes a multivalent salt, one or more liquid alcohol additives and a thickening agent; with (b) a second aqueous solution that includes an alginate bath. The combination uses extrusion machinery to mass produce spherical beads, less than about 20 mm in typical diameter, with a liquid alcohol center encapsulated in a gelled outer shell. The resulting end product should be collected and stored in a third aqueous solution that maintains similar properties to the first aqueous solution and one or more liquid alcohol additives.

19 Claims, 4 Drawing Sheets

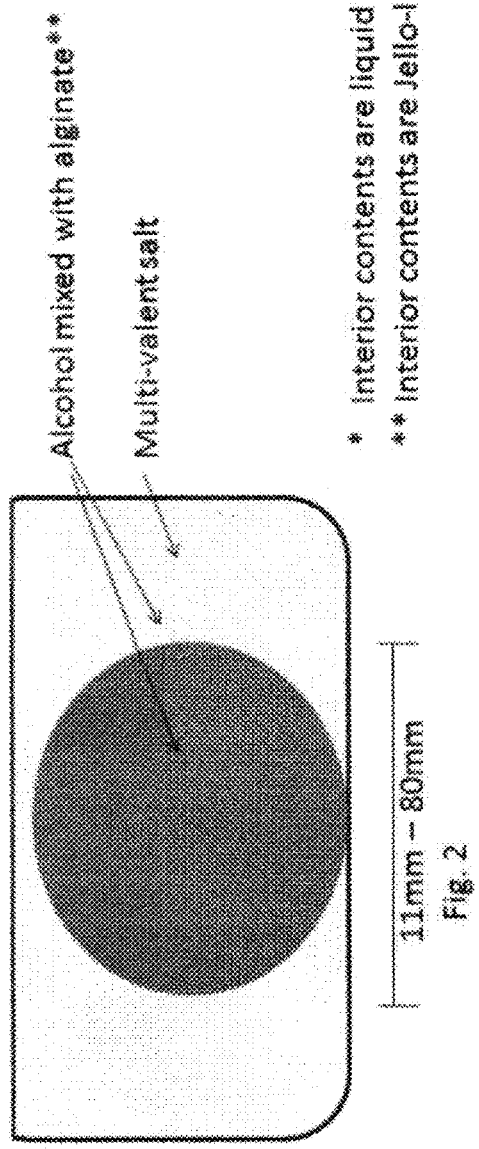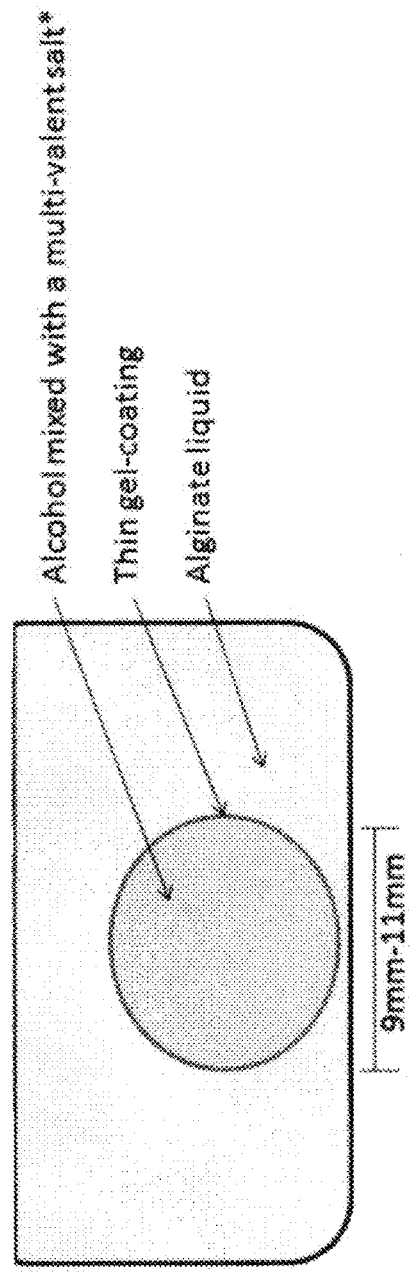

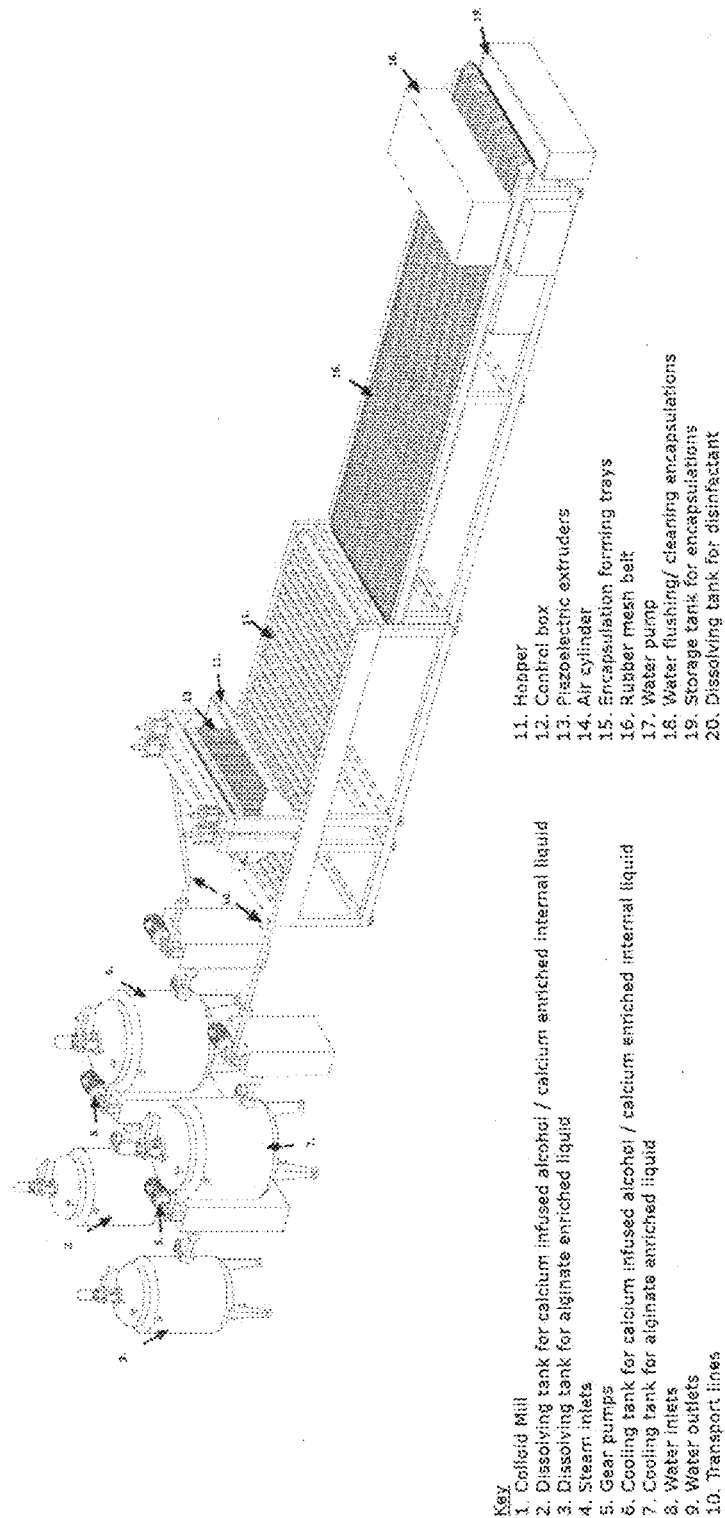

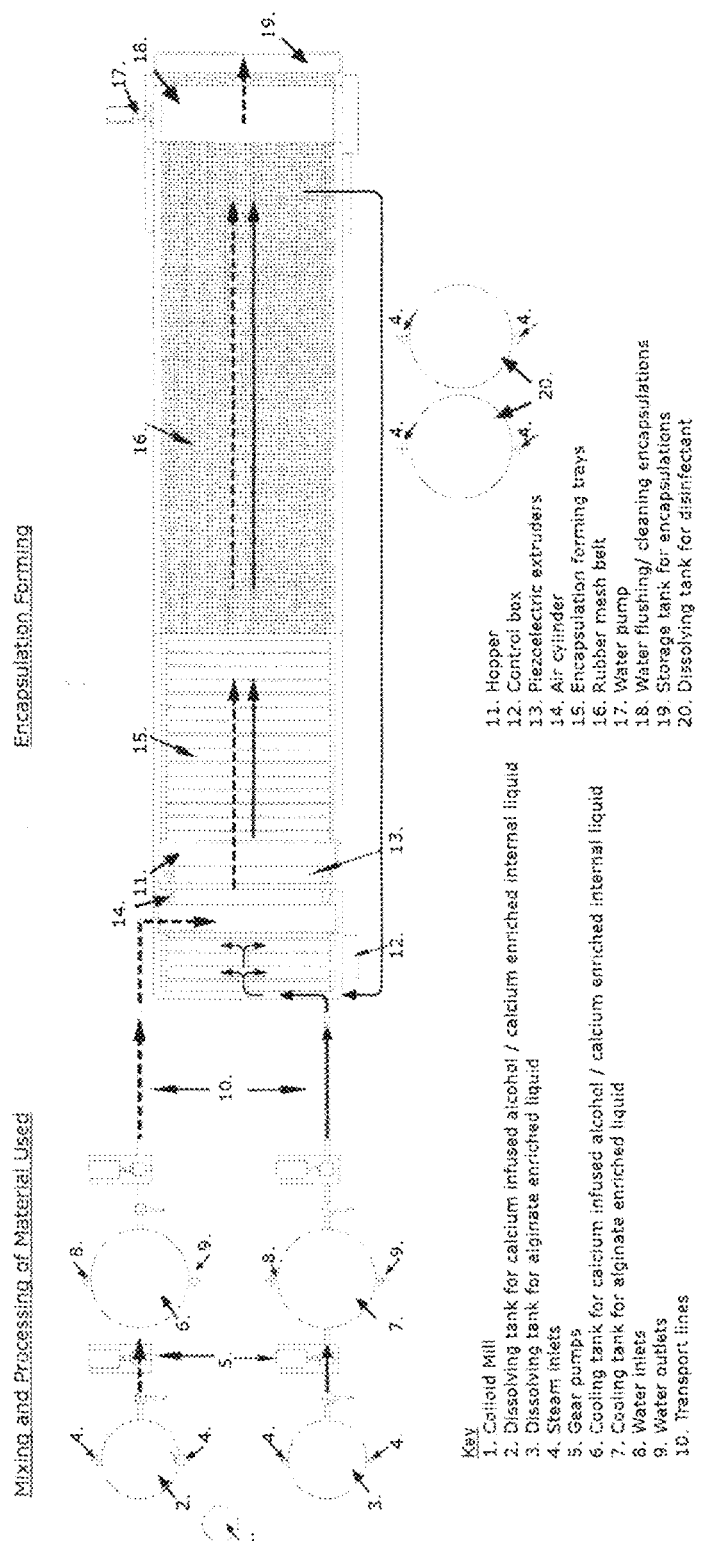

METHOD FOR MASS PRODUCING ALCOHOL-CONTAINING SPHERICAL BEADS

CROSS-REFERENCE TO RELATED APPLICATION

This application is a continuation-in-part of application Ser. No. 14/069,330 filed on Oct. 31, 2013, the disclosure of which is fully incorporated by reference herein.

BACKGROUND OF THE INVENTION

1. Field of the Invention

This invention relates to a method for making alcohol-containing spherical food and drink products. It further relates to small, encapsulated liquid beads that can be mass-produced, made in advance, stored and used as needed.

2. Relevant Art

U.S. Pat. No. 4,507,327 discusses a method for making alcohol beads that after initial formation soaks the beads in water and allows alcohol to transfer through its outer membrane. The end product should not exhibit the quality, firmness, and shelf life of this invention, however. Those beads serve as more of a 'temporary enclosure". The liquid/water in them is apt to ooze out. To prevent such oozing, a bit of flavor and a thickening agent is added for preserving them in a state of aggregation by immersion in the same kind of liquid.

WO Patent Application No. 2009022909 describes a bead manufacturing process without detailing actual alcohol spherification. And WO Patent Application No. 2011138478 describes a way to spherify carbonated beverages, focusing on wine, sparkling wine and champagne. They do not elaborate on bead size or utility and their simplistic production method will likely result in smaller, poorer quality beads, inconsistent in size, and with a short shelf life.

European Patent Application No. 1,629,722 discloses a plurality of gelled (i.e. solid) beads but with no liquid dispersion inside. Such beads do not contain alcohol. Rather, they are intended as food product additives, including during fruit preparation, in yogurts, or as an ice cream topping.

Finally, there is the method for preparing alginate-based compositions from U.S. Published Application No. 20120269927. That method teaches creating a gelatinous alcohol ball (or rounded "Jello® shot"), almost instantaneously, at the bar. It combines alcohol with alginate and drops that mixture into a calcium bath.

The present invention differs from the earlier known method in several key aspects. First, alcoholic encapsulation is accomplished by distinctly different means.

The prior art (whose end product is schematically shown at FIG. 1), mixes alcohol with an alginate to make a first composition. In front of the end consumer, a bartender adds that first composition to a multivalent salt (second composition) for turning that whole concoction into a Jello®-like ball. Even the inside of that sphere gets "gel-ified". By contrast, the present invention mixes alcohol with a multivalent salt before surrounding the same with an alginate liquid (the order of mixing being critical). The process does not "gel-ify" throughout, but rather creates a thin outer layer that surrounds the liquid-y alcohol center. In other words, the inside contents of these spheres remain physically unchanged (per FIG. 2).

Through different encapsulation means, different end product results. Unlike the fully gelled Jello® spheres of the prior art (FIG. 1) that measure 1.1 to 8 cm wide (and more typically 3 inches in diameter), the round beads of this process (less than 1.1 cm wide) are little alcoholic balls that can be popped like a bubble when bitten thus creating a totally different experience and feel. See, FIG. 2. The bead/spheres of this invention are not Jello-like. Rather, they are meant to encapsulate alcoholic liquid in little spheres.

Further, this invention describes an alcohol encapsulation that when aggregated together, forms large quantities of alcohol encapsulations that are: (a) uniform in shape, (b) consistent in the thickness of the shell, (c) consistent in the quality of the 'popping' sensation that a consumer would experience, and (d) efficiently mass-produced. The method for using machinery to mass-produce such alcohol encapsulations is also described herein.

Finally, the spirit (pun intended) of these two methods are quite distinct. The prior art method makes large, fully gelled alcoholic balls, in situ, or directly in front of the consumer by a bartender or waitstaff. That is because the other method for making true Jello® shots is too time consuming and cannot be easily customized. The present invention, by contrast, makes product that can be manufactured in bulk, well in advance, in a separate (more sterile) factory setting, using the equipment/machinery described below, and then stored for prolonged periods (a year, even longer) before being sold and shipped to bars and restaurants for consumption as needed. In addition, the beads/spheres of this invention can be served at varying temperatures: from frozen, to slightly chilled, to room temperature, warm and even quite hot. As such, the end product of this invention can be USED by anyone, not just specialized bartenders and cocktail makers, almost anywhere, even in their own homes.

SUMMARY OF THE INVENTION

This invention makes pre-formed liquid alcohol beads by adding a multivalent salt to a polysaccharide fluid bath with the machinery described herein. One preferred combination drops an emulsion containing calcium ions into a sodium alginate solution. Such a product can be prepared in advance and stored for subsequent consumption. It does NOT require immediate consumption after in situ manufacture.

For potential manufacture and sale under the name, Cocktail Caviar™, these small, pop-able liquid alcohol spheres are meant to "burst" with flavor when bitten. Initially, they will be offered in several varieties including: Rose Wine, Mango Rum, Passionfruit Rum, Strawberry Vodka, Peach Vodka, Orange Vodka, Blueberry Vodka, Cantaloupe Vodka, Whiskey and Coffee Whiskey though still other flavored variants are expected and anticipated.

In a glass of wine, the beads of this invention can be the "pearl" sitting at the bottom . . . to be saved (and savored) for last. Frozen, they can serve as a top-shelf cocktail ice or sharable dessert akin to an alcoholic melon-ball sorbet. The invention will work as a distinguishing ingredient in signature cocktails, or as a popular upsell that may even outsell the "floater". It can be a crowd-pleasing social aperitif before the meal and a premium desert topping after.

The beads of this invention are produced in bulk by "pushing", or more accurately extruding, droplets of calcium-enriched alcohol into a sodium alginate solution using the machinery described below. Internally, a network of inter-connecting carbon molecules will form around the liquid-y alcohol middle to create an edible spherical shell.

At room temperature, the beads of this invention will have an expected shelf life of about 1 year. Such spheres should tolerate a wide range of temperatures without affecting quality, from (not irretrievably) frozen . . . to as high as 187° F.

In one aspect, this invention features a method for taking a first liquid containing a multivalent salt and alcoholic beverage, and adding it to a second liquid containing an alginate alkali metal salt. One method for combining these is by extruding the first into a bath of the second resulting in a LIQUID alcohol-encapsulated shell roughly 10 mm in diameter, i.e., one in which the middle materials remain liquid rather than fully gelled (or gel-ified). The resulting beads are stored in a third liquid, which acts as a preservation liquid for the encapsulated alcoholic beads. The stored beads are packaged, and shipped while in a state of submersion in that third liquid.

In one embodiment, the first liquid contains a multivalent salt like calcium lactate or calcium chloride. Preferably this first liquid includes about 0.2 to 10 wt.%, and more preferably between about 0.5 to 5 wt.%, multivalent salt. That first liquid gets added to a second liquid containing an alginate alkali metal salt like sodium or potassium alginate. The second liquid preferably includes about 0.3 to 10 wt.%, and more preferably between about 0.5 to 6 wt.%, alginate.

Some embodiments of the foregoing combinations may further include one or more of: a viscosity adjusting agent, such as pectinase or another enzyme; an anti-bitterness agent like sodium benzoate or potassium sorbate; a thickening agent, such as xanthan gum, starch, or another polysaccharide; a pH buffer like phosphoric or citric acid; an artificial sweetener like sugar or corn syrup and/or a preservative like sodium benzoate, sodium metabisulfite, or potassium sorbate.

Both the first and second solutions include solvent, preferably water, and more preferably deionized water. And one or both solutions may have liquid alcohol additions incorporated therein. Representative "beverages" for beading by the method of this invention include (but are not limited to): wine, sherry, brandy, liqueurs, port, vodka, gin, whisky, scotch, cognac, tequila, rum, or champagne. To a lesser extent, it may be possible to make and serve little beer balls hereby. Ideally, the first (or second) liquid would have added therein, an alcoholic content between about 1 to 95% by volume, more preferably between about 7 to 20% by volume alcohol. This invention also includes the production of encapsulations of a non-alcoholic first liquid that, after encapsulation, gets infused with alcohol through osmosis.

It is important that the resulting alcoholic beads be stored in a third composition which is an aqueous liquid that preferably contains an alcohol content, pH balance, and flavor profile similar to the first liquid, for giving the resultant end product longer shelf life.

BRIEF DESCRIPTION OF DRAWINGS

Further features, objectives and advantages of this invention will become clearer with the following description of preferred embodiments made with reference to the accompanying drawings in which:

FIG. 1 is a schematic view showing a PRIOR ART bead and its relative size;

FIG. 2 is a schematic view showing a bead made according to the present invention;

FIG. 5 is a perspective view of one representative equipment set up for mass producing alcoholic beads according to this invention with various component parts duly labeled; and FIG. 6 is a top plan view of the equipment from FIG. 5 with various component parts duly labeled.

DESCRIPTION OF PREFERRED EMBODIMENTS

Figure 3:
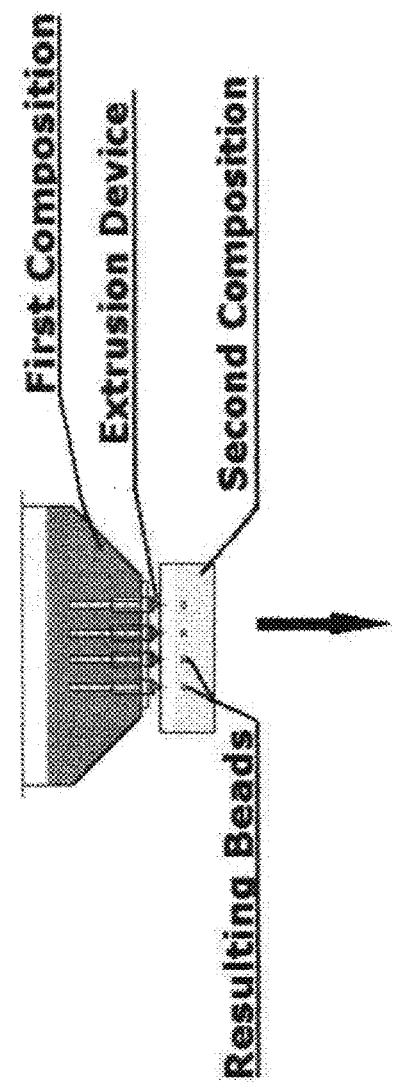
FIG. 3 is a front schematic view showing one representative set up for extruding beads per the present invention.

This disclosure relates to a method for preparing liquid alcohol-containing bead compositions. In one embodiment, a desired end product can be prepared by adding an aqueous composition containing a multivalent salt (hereinafter "the first composition") to an aqueous composition containing an alginate alkali metal salt ("the second composition"). The resultant spheres include an aqueous solution that remains "ungelled" but encapsulated in a water-insoluble shell or outer coating. The first composition generally includes a multivalent salt and solvent (e.g., water). The "multivalent salt" mentioned herein refers to one or more salts containing a multivalent cation (e.g., $Ca^{2+}$, $Mg^{2+}$, or $Mn^{2+}$). Representative multivalent salts include calcium chloride, calcium lactate, calcium lactate gluconate, magnesium chloride, or manganese chloride. It is believed that when this first composition contacts with the second described below, the multivalent cations of the first will cross-link with polysaccharides in the second thereby forming coordination bonds to make an outermost encapsulating exterior.

In some embodiments, the first composition can include from about 0.2 to 10 wt % and preferably about 0.5 to 5 wt. % of the multivalent salt. Without wishing to be bound by theory, it is believed that, if the first composition contains less than about 0.2% by weight of the multivalent salt, it would not be effective in forming a water-insoluble encapsulating coating. Further, if the first composition contains more than about 20% by weight of the multivalent salt, it could have a relatively strong bitter taste or have a relatively short shelf life (e.g., by forming a precipitate).

The first composition also includes a water-based solvent. In some cases, the first composition includes from about 50 to 99 wt. % water, preferably between about 60 to 80 wt. % water.

In some embodiments, the first composition can further include an anti-bitterness agent. Examples of suitable anti-bitterness agents include sodium benzoate, potassium sorbate, or inverted sugar.

In embodiments when the first composition contains a relatively large amount of multivalent salt, an anti-bitterness agent (e.g., sodium benzoate, potassium sorbate, or inverted sugar) can be added to cover or eliminate the bitter taste of that composition. In general, the first composition can include from about 0.01% to about 1% by weight and preferably about 0.3 to 0.7% by weight anti-bitterness agent. Certain anti-bitterness agents can also function as a preservative (e.g., sodium benzoate or potassium sorbate) or a sweetener (e.g., an inverted sugar).

In some embodiments, the first composition can further include a thickening agent. Examples of suitable thickening agents include polysaccharides, such as xanthan gum, guar gum, starch, or agar agar. In general, the first composition can include from about 0.005% to about 3.5% by weight, or preferably about 0.01% to 3.1% thickening agent. It is believed that adding a thickening agent to the first composition results in remarkable improvement to the spherification process (e.g., better sphere integrity and consistency), when mixed with alcohol. Particularly, adding a thickening agent (e.g., xanthan gum or starch) to the first composition allows it to be mixed with a large variety of alcoholic beverages with different viscosities to form spheres consistently with improved integrity.

In some embodiments, the first composition can further include a pH buffer to maintain and/or adjust its pH. Examples of suitable pH buffers include phosphoric acid and its salts or citric acid and its salts (e.g., sodium or potassium salts). The pH buffer can be formed by adding an acid alone to the first composition. The acid, together with the cations in the other first composition ingredients, can form the pH buffer. Alternatively, the pH buffer can be formed by directly adding an acid and its salts into this composition. In general, the first composition can include from about 0.1% to about 2% by weight, preferably about 0.2% to 1% by weight of pH buffer.

In some embodiments, the first composition can further include a sweetener. Examples of suitable sweeteners include sugars, fructose, corn syrup, and inverted sugars. In general, the first composition can include from about 1.5% to about 30% by weight, preferably about 10% to 20% by weight sweetener. It is believed that in addition to imparting sweetness, the above amount of sweetener additions may improve spherification as the weight of that sweetener prevents a sphere from floating at the surface of the composition thereby negatively impacting mechanical strength and/or sphere integrity. Certain sweeteners can also function as a thickening agent (e.g., fructose or an inverted sugar).

In some embodiments, the first composition can further include a preservative. Examples of suitable preservatives include sodium benzoate, sodium metabisulfite, or potassium sorbate. In general, the first composition can include from about 0.01% to about 1% by weight, and preferably about 0.3% to 0.7% by weight preservative. It is believed that the above amount of preservative can effectively inhibit growth of bacteria, molds, or yeasts and extend shelf life of this first composition without imparting any undesired changes in taste, odor, viscosity, or color thereto. Certain preservatives can also function as an anti-bitterness agent (e.g., sodium benzoate or potassium sorbate).

The first composition may be mixed with ethyl alcohol, or any form of liquor/spirit/wine, to prepare an alcoholic food product. For example, the first composition can be mixed with ethyl alcohol (95% to 97.5% alcohol by volume) to form a mixture containing about 2% to about 40% by volume ethyl alcohol. The ethyl alcohol can be pre-mixed with the first composition and stored for an extended period of time. It can be added either in a pure form or as an ingredient in an alcoholic beverage.

Alternatively, the encapsulations can be produced without alcohol and then soaked in an alcoholic composition wherein the alcohol would permeate the encapsulations by osmosis.

Without being bound by theory, it is believed that a resulting alcoholic bead containing more than 60% alcohol by volume will have a deteriorating effect on the coating shell, reducing the shelf life of the end product. Further, if the resulting beads have an alcohol content above 40% by weight, the end product could be deemed by regulators to be unfit for public consumption, as the beads could be swallowed like pills, instead of being popped as intended, and could be harmful to the public.

In some embodiments, the first composition can further include one or more additives, such as natural or artificial flavoring agents, or natural or artificial coloring agents. Examples of flavoring agents include flavor extracts (e.g. peach extract, orange extract, strawberry extract, oakwood extract). Examples of artificial coloring agents include FD&C, Blue No. 1, Blue No. 2, Green No. 3, Red No. 40, Red No. 3, Yellow No. 5, and Yellow No. 6. Examples of natural coloring agents include caramel E150, annatto E160b, chlorophyll E140, cochineal E120, betanin, turmeric E100, saffron E160a, paprika E160c, elderberry juice, pandan, and butterfly pea.

The second composition generally consists of an alginate alkali metal salt and a solvent. The alginate alkali metal salt can be formed between alginate anions and alkali metal cations. Examples of suitable alginate alkali metal salts include sodium alginate and potassium alginate. In some embodiments, the second composition includes from about 0.3% to 10% by weight, preferably from about 0.5% to 6% by weight alginate alkali metal salt.

The solvent in the second composition can also include water. In some embodiments, from about 90% to about 99.6% by weight, preferably 94% to 99.5% by weight water.

Preferably, the solvent in both compositions includes deionized (or distilled) water. It is believed that it is advantageous to use deionized water as residual ions (e.g., calcium ions) in water could form precipitates with the alginate salt, thereby reducing the shelf life of this second composition.

In general, the alcohol bead product described herein is prepared by adding the first composition into the second composition via extrusion. See the description of this process above and in FIGS. 5 and 6. One preferred method of manufacture employs a drop-on-demand jetting system that extrudes droplets of first composition into a lower bath of the second composition. That arrangement allows the calcium (first composition) to diffuse into the polysaccharide (second composition) thus forming a polysaccharide outer gel that effectively encapsulates the still liquidous first composition inside.

As an alternate to the foregoing calcium ion-induced gelation, other polymers can be used. They will form gels by such means as cooling or heating (e.g. gelatin, agar, gellan). A "co-extrusion" method can also be used. This method takes an emulsion, without calcium or other divalent ions, and co-extrudes the same with a gel-forming component so that latter extrudes as an outer layer surrounding the emulsion. Such extruding forms droplets then either: (a) fall into a calcium or other divalent ion-containing solution (if alginate or pectinase is employed as the gel-forming component); or (b) form by cooling down or heating up one or more of the other gel-forming components, e.g., gelatin or gellan, discussed above. A nozzle, more particularly a vibrating nozzle, is preferably used when co-extruding beads by this alternate approach. Such nozzles result in well-shaped capsules having a narrow size distribution.

Figure 4:
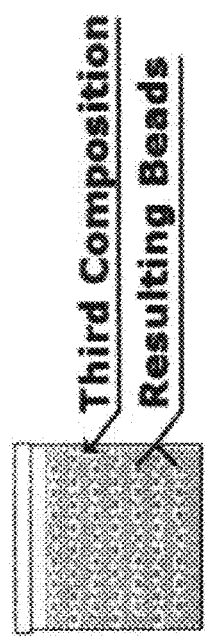
FIG. 4 is a front schematic view showing one representative container for storing and transporting these pre-made alcoholic beads to consumers.

Referring to representative FIG. 4, a collection tank container for one "third composition" for this invention consists of a liquid similar to that of the first composition. To ensure a long shelf life (one year or longer), the resulting alcohol beads are best preserved when the beads are submerged in this third liquid. Maintaining a sugar content, pH balance, flavor and color profile, and alcohol content similar to that of the bead interiors minimizes (or otherwise slows) transference through the membrane coating.

The resultant food product is a sphere (or ball) containing an aqueous solution encapsulated by the coating. As the encapsulating coating forms by cross-linking of alginate molecules, the sphere interior thus formed can be free of gelatin and does not require heating and cooling.

The beadlike food product prepared by the method described above is intentionally "alcohol-containing".

Examples of alcoholic ingredients include wine, sherry, brandy, liqueurs, port, vodka, gin, whisky, scotch, cognac, tequila, rum, or champagne.

In other instances, the method described above can be used to prepare a multilayer bead like a food product with an encapsulated aqueous solution surrounded by another encapsulated aqueous solution. In one such example, a relatively small amount (e.g., about 0.5 ml) of first composition is added to a second composition to form a sphere with the first solution surrounded by a first encapsulation coating. After excess second composition is removed (e.g., by filtration or decantation), the resulting beads can be co-extruded so that a different gel-forming component becomes extruded as an outer layer surrounding the initial bead. In one version, the large (first level) droplets are extruded into a calcium- or other divalent ion-containing solution. The food product thus formed is a bilayer sphere, i.e., one having an encapsulated inner aqueous solution surrounded by yet another encapsulated (outer) solution.

The food-like beads that result from this invention will exhibit a flavor and mouth-feel sensation to the person consuming it because of the still liquid encapsulation described above. Preferably this is a burst effect, or "splash", from the sudden release of liquid alcohol in the consumer's mouth.

The consumer who bites down, squeezes or otherwise causes one or more such beads to break open in his/her mouth will experience alcohol in a new, refreshing manner. By selective blending in the same bead, alternating between beads, or combining different varieties of beads at the same time, consumers will be able to enjoy two or more alcoholic flavors and sensations. The differing tastes can be complimentary or intentionally contrasting. Note, however, that contrasting taste stimuli are not necessarily incongruent. So long as they are well compartmentalized and their release kept sudden, distinct encapsulated flavors can still be "experienced together".

These alcohol beads are primarily intended for serving as additives to a cocktail or non-alcoholic beverage. They will either sink to the bottom of a glass, or float around the beverage when densities are similar, or when these alcohol beads contain air bubbles. Either way, they will provide an aesthetic appeal until bitten and consumed. Alternately, the alcohol beads of this invention can be eaten directly from a bowl, as "finger food", or consumed like one would a "shot" of alcohol.

When frozen, these same alcohol beads can be used as a replacement for ice in a cocktail and/or non-alcoholic beverage. Unlike ice, however, which can water down a drink as it melts, the frozen beads of this invention will instead thaw back to their standard liquid-y middle forms.

Suitable edible shell materials that can be used in less preferred embodiments include: (a) polymers, like the polysaccharides pectinase, gellan, or carrageenan; or (b) proteins, notably milk protein and milk-derived proteins like casein (or caseinate) and gelatin. For any such "wall" alternative, it is preferred that such materials form gels or can otherwise cross-link and/or rapidly harden.

The resulting food like beads have a rounded, spherical shape (i.e., not flattened or oval) with a typical size diameter ranging from about 1 to 20 mm, preferably between about 9 to 11 mm, and most preferably around 10 mm "wide".

In a cocktail or other beverage, the resulting beads can be used to represent overall drink volumes from about 0.1 to 50%, and more preferably between about 3 to 20% by volume. As a cocktail garnish, usually only about 4 to 8 beads need to be added to a standard size consumable. Though for a more substantial cocktail, 40 to 70 such beads may be added.

Description of Machinery and Mass Production Process

One key to better understanding the utter novelty of this invention is the production of a spherical alcohol product in a method that is (a) cost efficient, (b) produces spherical alcohol beads that are consistently uniform in size and quality, (c) produces spherical alcohol beads that are shelf stable for a year or more to allow for distribution and use by bars and restaurants, and (d) produces spherical alcohol beads at a large enough scale to allow for commercial sale and wide-scale distribution.

FIGS. 5 and 6 show the 2 phases of mass production via the present invention, FIG. 5 in perspective view and FIG. 6 is a more detailed, component-labeled top view. The first phase includes the mixing and processing of the materials used.

First, the ingredients for the liquid to be encapsulated, described below as the "first composition", are heated up, mixed, dissolved together, and cooled (per elements 1, 2 and 6 in FIG. 6). These ingredients are described below but in general include water, alcohol, flavor, and multivalent salt.

Simultaneously, the ingredients for the alginate encapsulating liquid, described below as the "second composition", are heated up, mixed, dissolved together, and cooled (elements 3 and 7). These ingredients are described below but in general include water and an alginate alkali metal salt.

Simultaneously, the calcium enriched first composition is transported into a hopper (element 11). At the bottom of this hopper are piezoelectric extruders (element 13) for extruding out droplets of the first composition in a uniform and continuous manner.

In Phase 2, the two mixed compositions are combined to create mass produced alcohol encapsulations. During phase 2, the alginate enriched second composition is transported and extruded into trays (element 15).

The machine continuously moves alginate-enriched trays under these continuously extruded droplets. Once the encapsulation shells have formed to the desired thickness, the trays drop the encapsulations out onto a rubber mesh belt (element 16).

The machine next moves the formed encapsulations across the rubber mesh belt and under a water sprinkler (see, pump 17) where residue from the second composition is cleaned off. The encapsulations are then stored in a collection tank (element 19) that includes what is described herein as the "third composition".

EXAMPLE

One representative example according to this invention has a first composition containing: 1 parts by weight calcium lactate, 65 parts by weight water, 12 parts by weight ethyl alcohol, 19 parts by weight fructose, 3 parts by weight starch, 0.01 parts by weight xanthan gum, 0.2 parts by weight of citric acid, 0.03 parts by weight of potassium sorbate, and 0.08 parts by weight of strawberry flavor extract.

It is to be mixed with a second composition comprising: 5 parts by weight of sodium alginate and 95 parts by weight of deionized water.

The resulting beads will be stored in a third composition comprising: 67 parts by weight deionized water, 12 parts by weight of ethyl alcohol, 20 parts by weight of fructose, 0.08 parts by weight of strawberry extract.

Generally, all of the foregoing ingredients can be obtained from commercial sources.

It is to be understood that the present invention is not limited to the foregoing particulars. Other modifications and variations are possible as appreciated by those skilled in the art in light of the foregoing.

What is claimed is:

1. A method for mass producing an alcohol-containing, wet food product with a shelf stable life, a thin, edible outer shed and a purely liquid interior, said method comprising: (a) preparing a first aqueous solution that includes, a solvent, multivalent salt, one or more liquid alcohol additives, a preservative and a thickening agent; (b) preparing a second aqueous solution that includes an alginate bath; (c) extruding the first solution into the second solution to form consistently spherical beads of a non-gelled liquid alcohol encapsulated in the thin, edible outer shell; and (d) storing the thin, edible outer shell with its non-gelled liquid alcohol center in a third aqueous solution.

2. The method of claim 1 wherein the monovalent salt of the first aqueous solution is selected from the group consisting of calcium chloride, calcium lactate, calcium lactate gluconate, magnesium chloride, manganese chloride and combinations thereof.

3. The method of claim 2 wherein the monovalent salt of the first aqueous solution is selected from the group consisting of calcium chloride, calcium lactate, calcium lactate gluconate and combinations thereof.

4. The method of claim 1 wherein the first aqueous solution contains about 0.2 to 10 wt. % of the monovalent salt.

5. The method of claim 1 wherein the first aqueous solution further contains about 50 to 99 wt. % of an aqueous solvent.

6. The method of claim 5 wherein the first aqueous solution contains about 60 to 80 wt. % water as the aqueous solvent.

7. The method of claim 1 wherein the thickening agent includes a polysaccharide.

8. The method of claim 7 wherein the polysaccharide is selected from the group consisting of xanthan gum, starch and combinations thereof.

9. The method of claim 1 wherein the first aqueous solution contains between about 2 to 40% alcohol by volume resulting from a liquid alcohol additive selected from the group consisting of neutral spirits, ethyl alcohol, wine, sherry, brandy, liqueur, port, vodka, gin, whisky, scotch, cognac, tequila, rum, champagne and combinations thereof.

10. The method of claim 1, which further comprises:
adding to the first aqueous solution at least one of: an anti-bitterness agent, a pH buffer, a sweetener and a preservative.

11. The method of claim 1, which further comprises:
adding to the first aqueous solution one or more flavor extracts.

12. The method of claim 1 wherein the second aqueous solution includes between about 0.3 to 10 wt. % of an alginate selected from the group consisting of sodium alginate, potassium alginate and combinations thereof.

13. The method of claim 12 wherein the second aqueous solution further contains from 90 to 99.6 wt. % of an aqueous solvent.

14. The method of claim 1 wherein the food product is a spherical bead having a typical diameter between about 1 to 20 mm.

15. The method of claim 14 wherein the spherical bead has an average diameter between about 9 to 11 mm.

16. A method for mass producing a consistently spherical, shelf stable food product having an average diameter greater than about 8 mm and less than about 20 mm with a thin, edible outer gelatinous shell that encases an alcohol-containing, non-gelatinous, purely liquid center, said method comprising:(a) providing a first aqueous solution that includes a calcium-containing monovalent salt, between about 2 to 40% alcohol by volume resulting from the addition of one or more liquid alcohol additives, a preservative, a thickening agent and a water solvent; (b) providing a second aqueous solution that includes a sodium or potassium alginate bath; (c) extruding the first aqueous solution into the second aqueous solution to form the food product with a thin, edible outer shell that encapsulates an alcohol-containing, non-gelatinous liquid center; and (d) storing the resulting spherical food product in a third aqueous solution that includes one or more ingredients used in the first solution and one or more liquid alcohol additives.

17. The method of claim 16, which has a diameter between about 9 to 11 mm.

18. The method of claim 16 wherein the liquid alcohol additive is selected from the group consisting of: natural spirit, wine, sherry, brandy, liqueur, port, vodka, gin, whisky, scotch, cognac, tequila, rum, champagne and combinations thereof.

19. A method for rapidly making a batch of shelf stable, substantially spherical wet food products, each spherical food product produced by the method: (i) measuring less than about 20 mm in typical diameter; and (ii) having a thin, edible outer gelatinous shell that encases an alcohol-containing, liquid center, said method comprising:
(a) providing a first aqueous solution that includes a calcium-containing monovalent salt, between about 2 to 40% alcohol by volume from the addition of one or more liquid alcohol additives, a thickening agent and a water solvent;
(b) providing a second aqueous solution that includes a sodium or potassium alginate bath;
(c) extruding the first aqueous solution into the second aqueous solution to form the batch of spherical wet food products; and
(d) collecting and storing the spherical food products in a third aqueous solution having the same pH level, flavor profile and color profile as the first solution.

* * * * *